(12) United States Patent
Reiffel

(10) Patent No.: US 7,000,840 B2
(45) Date of Patent: *Feb. 21, 2006

(54) DUAL MODE DATA IMAGING PRODUCT

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 0 days.

This patent is subject to a terminal disclaimer.

(21) Appl. No.: 10/803,284

(22) Filed: Mar. 18, 2004

(65) Prior Publication Data

US 2004/0188525 A1 Sep. 30, 2004

Related U.S. Application Data

(63) Continuation of application No. 10/258,402, filed as application No. PCT/US01/13742 on Apr. 30, 2001, now Pat. No. 6,708,885.

(60) Provisional application No. 60/201,471, filed on May 3, 2000, provisional application No. 60/256,086, filed on Dec. 15, 2000.

(51) Int. Cl.
*G06K 7/10* (2006.01)

(52) U.S. Cl. .................. 235/462.41; 235/462.11; 235/462.24; 340/825.49

(58) Field of Classification Search ............... 235/454, 235/462.08, 462.12, 472.02, 462.41, 462.11, 235/462.24; 340/825.49, 825.69, 825.72, 340/572.1, 674
See application file for complete search history.

(56) References Cited

U.S. PATENT DOCUMENTS

| | | |
|---|---|---|
| 4,053,233 A | 10/1977 | Bien et al. |
| 4,099,050 A | 7/1978 | Sauermann |
| 4,228,403 A | 10/1980 | Iwamura et al. |
| 4,439,672 A | 3/1984 | Salaman |
| 4,603,231 A | 7/1986 | Reiffel |
| 4,637,797 A | 1/1987 | Whitney et al. |
| 4,650,334 A | 3/1987 | Alster et al. |
| 4,684,349 A | 8/1987 | Ferguson et al. |
| 4,945,914 A | 8/1990 | Allen |
| 4,998,441 A | 3/1991 | Stuart |
| 5,107,350 A | 4/1992 | Omori |
| 5,111,410 A | 5/1992 | Nakayama |
| 5,181,015 A | 1/1993 | Marshall et al. |
| 5,214,414 A | 5/1993 | Levine et al. |
| 5,260,556 A * | 11/1993 | Lake et al. .................. 235/494 |
| 5,282,045 A | 1/1994 | Mimura et al. |
| 5,415,553 A | 5/1995 | Szmidla |
| 5,453,015 A | 9/1995 | Vogel |
| 5,507,527 A | 4/1996 | Tomioka et al. |
| 5,563,401 A | 10/1996 | Lemelson |
| 5,710,416 A | 1/1998 | Belknap et al. |
| 5,712,658 A | 1/1998 | Arita et al. |
| 5,729,220 A | 3/1998 | Russell |
| 5,756,981 A | 5/1998 | Roustaei et al. |

(Continued)

FOREIGN PATENT DOCUMENTS

EP     0 062 473     10/1982

(Continued)

*Primary Examiner*—Diane I. Lee
(74) *Attorney, Agent, or Firm*—Hallihan Intellectual Property Law; William J. Hallihan; Don Moyer

(57) ABSTRACT

An imager (11) has a locate mode (13) which detects light (31A, 31B) having a preset light property from at least one locator (21) in the imager field of view (12); and has a react mode which is caused by the locate mode to select light from a code region (22, 32A, 32B, 33B) over light not from the code region (81) and which outputs a signal (41) representing code in the code region.

6 Claims, 1 Drawing Sheet

U.S. PATENT DOCUMENTS

Figure 1:
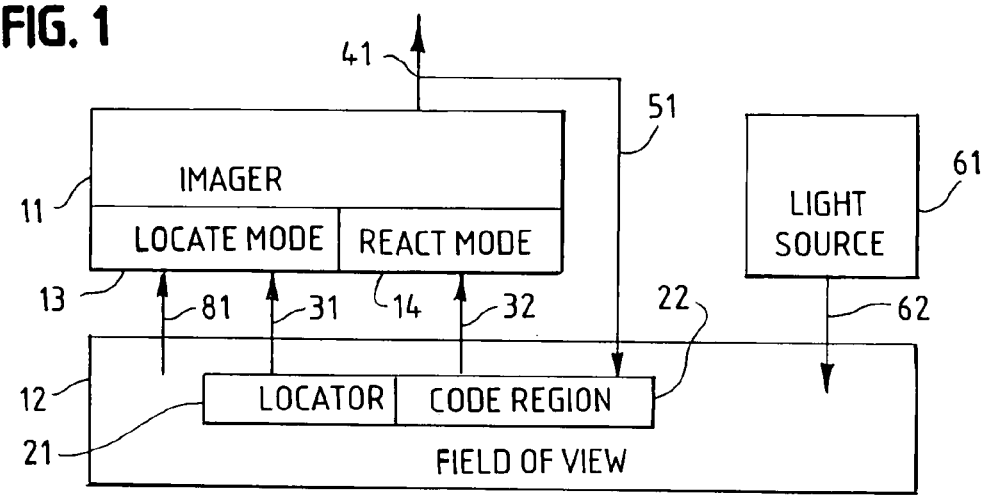

| | | | |
|---|---|---|---|
| 5,789,732 A * | 8/1998 | McMahon et al. | 235/487 |
| 5,795,161 A | 8/1998 | Vogel | |
| 5,821,523 A | 10/1998 | Bunte et al. | |
| 5,822,735 A | 10/1998 | De Lapa et al. | |
| 5,825,045 A * | 10/1998 | Koenck et al. | 250/566 |
| 5,826,578 A | 10/1998 | Curchod | |
| 5,835,237 A | 11/1998 | Ebrahimi | |
| 5,852,211 A | 12/1998 | Dumpelmann | |
| 5,852,823 A | 12/1998 | De Bonet | |
| 5,867,265 A | 2/1999 | Thomas | |
| 5,912,700 A | 6/1999 | Honey et al. | |
| 5,917,472 A | 6/1999 | Perala | |
| 5,917,486 A | 6/1999 | Rylander | |
| 5,963,145 A | 10/1999 | Escobosa | |
| 5,982,352 A | 11/1999 | Pryor | |
| 5,988,505 A | 11/1999 | Shellhammer | |
| 6,000,612 A | 12/1999 | Xu | |
| 6,047,893 A | 4/2000 | Saporetti | |
| 6,048,117 A | 4/2000 | Banton | |
| 6,056,199 A * | 5/2000 | Wiklof et al. | 235/462.45 |
| 6,082,619 A | 7/2000 | Ma et al. | |
| 6,118,848 A | 9/2000 | Reiffel | |
| 6,121,953 A | 9/2000 | Walker | |
| 6,155,489 A | 12/2000 | Collins, Jr. et al. | |
| 6,163,946 A | 12/2000 | Pryor | |
| 6,167,607 B1 | 1/2001 | Pryor | |
| 6,301,763 B1 | 10/2001 | Pryor | |
| 6,311,214 B1 | 10/2001 | Rhoads | |
| 6,314,631 B1 | 11/2001 | Pryor | |
| 6,317,953 B1 | 11/2001 | Pryor | |
| 6,330,973 B1 | 12/2001 | Bridgelall et al. | |
| 6,335,685 B1 * | 1/2002 | Schrott et al. | 340/572.1 |
| 6,542,083 B1 * | 4/2003 | Richley et al. | 340/825.49 |
| 6,545,670 B1 | 4/2003 | Pryor | |
| 6,708,885 B1 * | 3/2004 | Reiffel | 235/462.41 |
| 6,720,949 B1 | 4/2004 | Pryor | |
| 6,750,848 B1 | 6/2004 | Pryor | |
| 6,766,036 B1 | 7/2004 | Pryor | |
| 2002/0036617 A1 | 3/2002 | Pryor | |
| 2002/0183961 A1 | 12/2002 | French et al. | |
| 2004/0041027 A1 | 3/2003 | Reiffel | |
| 2003/0222145 A1 | 12/2003 | Reiffel | |

FOREIGN PATENT DOCUMENTS

| | | |
|---|---|---|
| EP | 0 840 248 | 5/1998 |
| EP | 1 020 810 | 7/2000 |
| FR | 2 694 827 | 2/1994 |
| WO | WO 87/07106 | 11/1987 |
| WO | WO 93/18478 | 9/1993 |
| WO | WO 96/32690 | 10/1996 |
| WO | WO 99/36836 | 7/1999 |
| WO | WO 99/66441 | 12/1999 |
| WO | WO 01/71397 | 9/2001 |
| WO | WO 01/84475 | 11/2001 |

* cited by examiner

DUAL MODE DATA IMAGING PRODUCT

This application is a continuation of U.S. patent application Ser. No. 10/258,402 filed 23 Oct. 2002 (now U.S. Pat. No. 6,708,885) under 35 USC 371 from PCT patent application PCT/US01/13742 filed 30 Apr. 2001 which claims benefit of U.S. provisional application 60/201,471 filed 03 May 2000 and U.S. provisional application 60/256,086 filed 15 Dec. 2000, all of which are incorporated herein by reference.

The dual mode product has an imager having a locate mode and a react mode. The locate mode detects a locator. A code region corresponds to the locator. Data is located in the code region. The react mode is caused by the locate mode to select light from the code region over light not from the code region. The react mode outputs a signal representing the data.

The dual mode product helps solve problems with locating and reacting to data sources in complex, changing environments. Because the react mode can ignore everything in the field of view except the code region, and because the output signal from the react mode can represent code without forming an image of the code, the dual mode product provides a low data processing burden solution to the problems.

For example, a locator can be two bands on a tag which retro reflect infrared light. The retro-reflected light is detected by the locate mode. The corresponding code region is the region on the tag between the two retro-reflecting bands. A code can be a particular sequence of color bands in this space. The react mode detects the sequence of color bands and outputs a signal representing the code.

The dual mode product can be used with the multi-source, multi-imager, multi-use product described in U.S. patent application Ser. No. 10/432,799 filed May 27, 2003 under 35 USC 371 from PCT application PCT/US01/48033 filed Dec. 10, 2001 which claims benefit of provisional application 60/256,086 filed Dec. 15, 2000. Examples here of using the dual mode product with this multi-use product are illustrative only. The dual mode product has many applications and is thus independent of any specific application.

In one example of use, tags can be connected to each container in a pharmacy, with a code region of each tag containing data which identifies the corresponding pharmacy container. Signals output by dual mode product can cause an information system to register the specific location of each specific pharmacy container at all times.

In a second example, a tag can be connected to a robot, with a code region on the tag containing data identifying the robot. Signals from the dual mode product can cause the information system to guide the robot through a complex, changing environment, for example to fetch a specific pharmacy container.

In a third example, a tag with a code region can be moved by a person, with the positions of the code region in the field of view being data. Signals from the dual mode product can cause functioning of a cursor in a computer display corresponding to the functioning caused by a computer mouse or equivalent input device.

In a fourth example, a tag can have a code region containing data instructing imagers to detect things such as the length of indicating fluid in a thermometer and such as the volume of material poured from a pharmacy container. Signals from the dual mode product can cause an information system to control heat flow to keep the temperature at a preset value and to stop flow of material from a pharmacy container after a preset volume has poured.

The invention provides progress over prior art shown for example in U.S. Pat. No. 5,912,700 by Honey Jun. 15, 1999, U.S. Pat. No. 4,998,441 by Stuart Mar. 12, 1991, U.S. Pat. No. 4,099,050 by Sauermann Jul. 4, 1978, and U.S. Pat. No. 4,053,233 by Bein Oct. 11, 1977.

Figure 2:
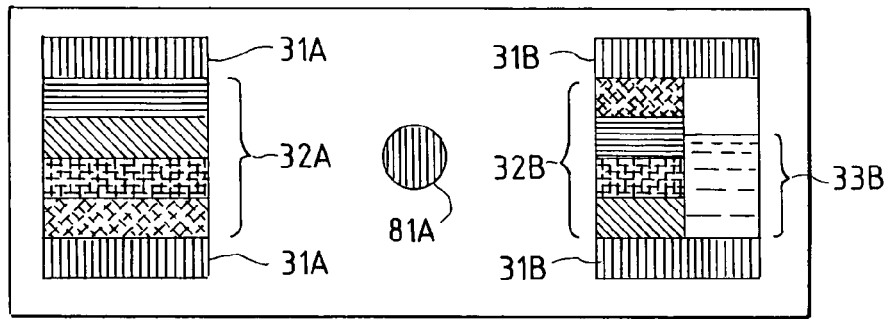
Figure 3:
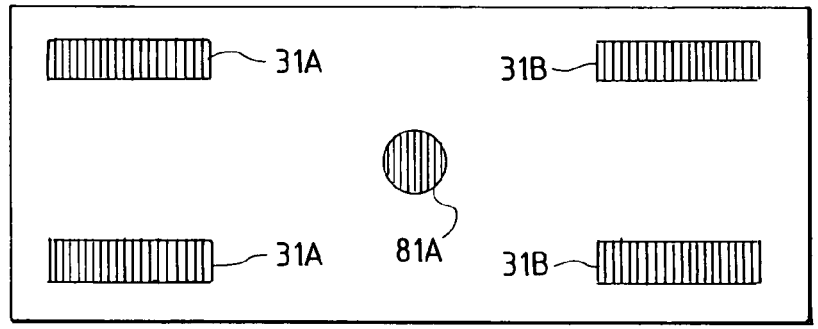
Figure 4:
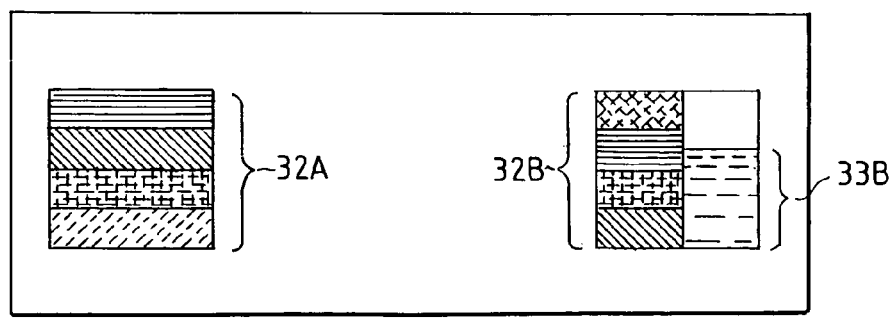

FIG. 1 depicts the product schematically.
FIG. 2 depicts light from an imager field of view.
FIG. 3 depicts locate light from the field of view.
FIG. 4 depicts code light from the field of view.

The dual mode product—schematically depicted in FIG. 1—comprises an imager 11 having a field of view 12 extending in each of three orthogonal directions. It should be noted that it is not necessary for imager 11 to form an image that is humanly recognizable and that the term imager can included apparatus that do not form images that are humanly recognizable. The product also comprises a locator 21 in the field of view.

Locate light 31 from the locator has a locate light property which has a preset value. A code region 22 corresponds to the locator. Code is located in the code region. Code light 32 from the code region represents the code. Code can be any data which can be used by an information system.

The locate light property can comprise various physical properties of light in fixed, variable, and modulated modes. These physical properties of light comprise intensities, frequencies, phases, polarizations, entanglements, blink rates, decay times, external shapes, internal shapes, linear motions, rotational motions, strain motions, distances from at least one reference point, and combinations of two and more physical properties such as these. Code can also be represented by a pattern comprising these physical properties in fixed, variable, and modulated modes.

The imager has a locate mode 13 which detects the locate light and detects the locate light property. The locate mode matches the locate light property detected to the preset value. "Match" can mean being in a range about the preset value, being greater than the preset value, and being less than the preset value. The locate light property and the preset value of the locate light property are devised so that properties of light not from the locator detected by the locate mode do not match the preset value.

The imager has a react mode, such as react mode directional antenna 14. The locate mode causes the react mode to select code light 32 over light 81 not from the code region and to detect code light when the locate light property detected by the locate mode matches the preset value.

The react mode outputs a code signal 41 which represents the code. The code signal can have any form which can be used by an information system. The code signal need not be an image of the code region. The code signal need only represent the code in a form which can be used by an information system.

The code signal can cause a loop signal 51 to interact with an agent associated with the code. An agent associated with the code can be a being or a device. An agent can be identified by the code. An agent can change the code. The loop signal can be electrical, photonic, visual, audible, tactile, and any other form useful to the being or device comprising the agent.

For example, a person can change the position of a code region in the field of view. The loop signal can be a display of a cursor tracking the positions of the code region. In another example, a device can be controlling a process. The code can indicate the value of a property (temperature for example) of the process. The loop signal can be input to the control device. The control device can use the loop signal to change the process accordingly.

Locate light from the locator and code light from the code region can have various sources such as: light reflected from ambient sources; a locator light source; a code light source; light emitted after energizing by suitable radiation; light emitted after energizing by suitable radiation with a characteristic decay time; a light source 61 adjacent to the imager illuminating 62 the locator; a light source 61 adjacent to the imager illuminating 62 the code region; and combinations of two and more of these.

"Light" is used here and throughout in the very general sense explained below in the following two paragraphs.

Locate light and code light are not limited to visible light. For example, infrared can be used, and millimeter and longer wavelengths can be used. Locate light and code light can be radiating energy from any portion of the electromagnetic spectrum which can provide the functions required here. Other forms of radiating energy—such as acoustic energy—which can provide the functions required here are included in the meaning of "light" here.

For example, "locate light" and "code light"—or either separately—can be in a radio frequency portion of an electromagnetic spectrum. In this case the imager locate mode and the imager react mode—or either separately—can be antennas. A react mode antenna can be a directional antenna. A locate mode antenna can have components in order to locate a code region relative to the locate mode antenna. A directional react mode antenna can select radiation from a code region over radiation not from the code region by being pointed to the code region by being spatially moved, pointed electronically (using phased array means for example), and pointed by combinations of these means.

Each of the constituents and properties described above and below—comprising an imager, a locater, locate light, a locate light property, a code region, code light, code, a locate mode, properties of light, a react mode, light not from the code region, and a react constituent—can have forms which function in the radio frequency portion of the electromagnetic spectrum to produce the results described above and below.

The several causal connections here—for example, locate mode to react mode, react mode to code signal, code signal to loop signal, loop signal to agent—can act via any of various modes of processing. The processing can utilize configured processing elements such as hard wired circuits, can utilize configurable processing elements such as field programmable gate arrays and neural networks, can utilize instructions in a data-bearing medium, and can utilize combinations of these. The processing can act by itself, can act via an information system, and can act via combinations of these. The processing—in part at least—can be a part of the imager.

There can be a plurality of locators. Each Cth locator in the plurality of locaters is identified here by the index integer C running from one to the total number of locators in the plurality of locators. The corresponding locate light, the corresponding code region, the corresponding code, and the corresponding code light are also identified here by the same index integer.

Each Cth locator is in the field of view. Cth locate light emanates from each Cth locator. Cth locate light emanating from each Cth locator has a locate light property. The locate light property has a preset value. The locate light property and the preset value of the locate light property are devised so that properties of light not from the locator detected by the locate mode do not match the preset value.

A plurality of code regions corresponds member-by-member to the plurality of locators. Cth code light emanates from each corresponding Cth code region. In the example depicted in FIG. 2, FIG. 3, and FIG. 4, C1 code light 32A from a C1 code region corresponds to C1 locate light 31A from a C1 locator, and C2 code light 32B from a C2 code region corresponds to C2 locate light 31B from a C2 locator.

In this example, C1 locate light 31A and C2 locate light 31B each comprise a pair of bands of retro-reflected infrared light. Spurious retro-reflected infrared light 81A is also present. The corresponding code regions here are the region between two bands of retro-reflected infrared light.

Many other conventions by which a code region corresponds to a locator can be adopted. A code region can be a region displaced from a locator by a factor. A code region can overlap the locator. The code region can be coextensive with the locator, with, for example, the locator monochromatically retro reflecting infrared light and the code region reflecting a chromatic pattern of visible light. In all cases the code light and the locate light are detected separately, and the code light properties do not match the preset value of the locate light property.

The locate light property here combines intensity (retro-reflected), frequency (infrared), and shape (two bands). While spurious light may share some of these physical properties, spurious light is highly unlikely to share all the physical properties of the combination comprising the locate light property.

The preset value of the locate light property in this example comprises light from two sources closer than a minimum distance, having an intensity greater than a minimum intensity, with a frequency in the infrared region. Light not from the locator detected by the locate mode does not match this preset value. The term "preset value" can comprise a numerical value, a characteristic, or correspond to a characteristic. Such characteristics are indicated elsewhere in the specification and can include shape, color, spectral reflectivity, adjacency to something else, phosphorescence, fluorescence, or spectral shifts.

Each Cth code light represents a corresponding Cth code. At least one first code from the plurality of codes can be different from at least one second code from the plurality of codes. Every code from the plurality of codes can be different from all the other codes from the plurality of codes.

Code light 32A, 32B depicted in the figures emanates from color bands—blue, green, yellow, orange in the 31A code region—and orange, blue, yellow, green in the 31B code region. Here the codes are the color band sequences imparting data according to a pre-established convention.

Code light can comprise any patterns of the physical properties of light listed above which can be detected by the react mode. Codes can comprise any pattern sequences which can impart data according to some pre-established convention.

The locate mode of the imager causes the react mode to select each Cth code light over light not from the Cth code region and to detect each Cth code light when the locate light property of the corresponding Cth locate light detected by the locate mode matches the preset value. The react mode outputs a code signal which represents each Cth code light and thus represents each Cth code from the plurality of codes.

At least one agent can be associated with at least one agent code from the plurality of codes. An agent can be a being and can be a device. An agent can be identified by the agent code. An agent can change the agent code. The code signal can cause a loop signal to interact with the agent. The loop signal can interact by electrical, photonic, visible, audible, tactile, and any other means which can be detected by the agent. An agent can be controlling a process. A process can be identified by the agent code. A process can be measured by the agent code. The loop signal can provide information about the status of the process. An agent can use a loop signal to change the process.

Codes can be fixed as in the 31A code region. Codes can be variable as in the 31B code region where part of the code light 33B comes from a variable length column which could represent temperature, pressure, fluid volume, and other variables. Here the loop signal can interact with an agent effecting the variable being represented by the column, for example by causing the agent to change heat input to change the temperature represented.

Code in a code region can include instructions to cause the imager to select light from a satellite code region. This satellite code region can include satellite code representing the status of a process. The code signal then will include a component representing the satellite code.

Code can comprise position of the code region relative to a frame of reference. Here code can also comprise motion of code region in the frame of reference. The react mode outputs a code signal which represents the position, and any changes of position, relative to the frame of reference.

In position and motion cases the loop signal can be a display of the position, and any motion. The display can be viewed by a person positioning the code region. The person can be guided by the display to position the code region to cause the displayed position, and any motion, to be as the person wants.

Locators and the corresponding codes can be anything which provides locate light and code light having the functions needed here. Both a locator and a code—and either alone—can be printed matter, can be markings on an object, and can be devices which provide locate light and code light having the functions needed here.

The react mode can view the same field of view as the locate mode. The react mode can view only the code regions in the field of view, where the field of view then is the locate mode field of view.

A locate mode can comprise a plurality of locate mode components. A react mode can comprises a plurality of react mode components. An imager can have a plurality of components, with each imager component having a locate mode component and a react mode component.

For example, there can be six locators and corresponding code regions and codes identified as C1, C2, C3, C4, C5, C6; two locate mode components identified as L1, L2; and three react mode components identified as R1, R2, R3. In the example locate mode component L1 can locate C1, C2, C3. Locate mode component L2 can locate C3, C4, C5, C6. React mode component R1 can output an R1 code signal component representing codes C2, C3, C4, C5. React mode component R2 can output an R2 code signal component representing code C1. React mode component R3 can output an R3 code signal component representing codes C5, C6.

A locate mode and a react mode can be one device alternately functioning as the locate mode and as the react mode. A locate mode and a react mode can be one device simultaneously functioning as the locate mode and as the react mode with locate light detected at locate mode pixels and code light being detected at react mode pixels. A locate mode and a react mode can be separate devices. A locate mode can be several devices working together, as can a react mode.

The field of view can comprise a plurality of component fields of view. A locate mode can sequentially view component fields of view from the plurality of component fields of view. A react mode can sequentially view component fields of view from the plurality of component fields of view. A locate mode can cause a react mode to view only field of view components containing code regions.

A locate mode and a react mode can sequentially view the same field of view components. Only one mode can sequentially view field of view components.

A light source adjacent to the imager can illuminate the locator, the code, and both. The locate light—and the code light—can be retro-reflected light. A light source can be scanned over the field of view, can be modulated, and can be both.

The react mode—and any react mode components—can comprise a first react constituent, and a second react constituent. The first react constituent detects a first code light property. The second react constituent detects a second code light property. The first react constituent and the second react constituent together cause output of the code signal.

For example, the react mode—and any react mode components—can have constituents with one sensitive to red light, one sensitive to yellow light, and one sensitive to blue light. The code signal does not need to combine code light constituents to form an image. The code signal needs only represent the code in a form which can be used by an information system.

What is claimed is:

1. A dual mode data imaging product comprising:
   an imager,
   the imager having a field of view,
   the field of view extending in each of three orthogonal directions;
   a locator,
   the locator being in the field of view;
   locate light,
   the locate light being from the locator;
   a locate light property,
   the locate light property having a preset value,
   the locate light having the locate light property;
   a code region,
   the code region corresponding to the locator;
   code,
   the code being in the code region;
   code light,
   the code light being in a radio frequency portion of an electromagnetic radiation spectrum,
   the code light being from the code region,
   the code light representing the code;
   a locate mode of the imager,
   the locate mode detecting the locate light,
   the locate mode detecting the locate light property,
   the locate light property and the preset value of the locate light property having been devised so that properties of light not from the locator detected by the locate mode do not match the preset value of the locate light property;
   a react mode of the imager comprising a directional antenna,
   the react mode being caused by the locate mode to select code light over light not from the code region and to detect the code light when the locate light property detected by the locate mode matches the preset value; and
   a code signal,
   the code signal being output by the react mode, and the code signal representing the code.

2. The product of claim 1 wherein the directional antenna is pointed at the code region by spatial movement.

3. The product of claim 1 wherein the directional antenna is pointed at the code region electronically.

4. A dual mode data imaging product comprising:

an imager, the imager having a field of view, the field of view extending in each of three orthogonal directions;

a plurality of locators, each Cth locator from the plurality of locators being in the field of view;

locate light, the locate light comprising each Cth locate light from each Cth locator from the plurality of locators;

a locate light property, the locate light property having a preset value, each Cth locate light having the preset value of the locate light property;

a plurality of code regions, the plurality of code regions corresponding member-by-member to the plurality of locators;

a plurality of codes, at least one first code from the plurality of codes being different from at least one second code from the plurality of codes, each Cth code from the plurality of codes being in the member-by-member corresponding Cth code region;

Cth code light from each Cth code region, the Cth code light being in a radio frequency portion of an electromagnetic radiation spectrum, each Cth code light representing the corresponding Cth code;

a locate mode of the imager, the locate mode detecting the locate light, the locate mode detecting the locate light property, the locate light property and the preset value of the locate light property having been devised so that properties of light not from the locator detected by the locate mode do not match the preset value of the locate light property;

a react mode of the imager comprising a directional antenna, the react mode being caused by the locate mode to select each Cth code light over light not from the Cth code region and to detect each Cth code light when the locate light property of the corresponding Cth locate light detected by the locate mode matches the preset value;

a code signal, the code signal being output by the react mode, the code signal representing each Cth code in the plurality of codes.

5. The product of claim 4 wherein the directional antenna is pointed at the Cth code region by spatial movement.

6. The product of claim 4 wherein the directional antenna is pointed at the Cth code region electronically.

\* \* \* \* \*